United States Patent
Frisk et al.

(10) Patent No.: US 10,399,158 B2
(45) Date of Patent: Sep. 3, 2019

(54) ENTRANCE AND EXIT CHIP RINGS FOR BALANCING BROACH FORCES

(71) Applicant: United Technologies Corporation, Farmington, CT (US)

(72) Inventors: Kenneth A. Frisk, West Hartford, CT (US); Stephen Ali, Plantsville, CT (US); Ryan B. Noraas, Hartford, CT (US); Raja Kountanya, Vernon, CT (US); Lauren Ketschke, Salem, CT (US)

(73) Assignee: United Technologies Corporation, Farmington, CT (US)

( * ) Notice: Subject to any disclaimer, the term of this patent is extended or adjusted under 35 U.S.C. 154(b) by 31 days.

(21) Appl. No.: 15/687,602

(22) Filed: Aug. 28, 2017

(65) Prior Publication Data

US 2019/0061026 A1    Feb. 28, 2019

(51) Int. Cl.
| | | |
|---|---|---|
| *B23D 43/02* | (2006.01) | |
| *B23D 43/00* | (2006.01) | |
| *B23D 39/00* | (2006.01) | |
| *F01D 5/02* | (2006.01) | |
| *F01D 5/30* | (2006.01) | |

(Continued)

(52) U.S. Cl.
CPC .......... *B23D 43/02* (2013.01); *B23D 39/00* (2013.01); *B23D 43/005* (2013.01); *B23D 37/22* (2013.01); *B23D 2043/025* (2013.01); *F01D 5/02* (2013.01); *F01D 5/3007* (2013.01); *F01D 15/12* (2013.01); *F04D 29/322* (2013.01); *F05D 2220/32* (2013.01); *F05D 2230/10* (2013.01); *F05D 2300/133* (2013.01); *Y10T 407/1685* (2015.01); *Y10T 409/40595* (2015.01)

(58) Field of Classification Search
CPC ..... Y10T 409/400175; Y10T 409/4028; Y10T 409/405775; Y10T 409/40595; Y10T 409/4063; Y10T 409/404375; Y10T 407/16; Y10T 407/1614; Y10T 407/1642; Y10T 407/1671; Y10T 407/1685; B23D 37/02; B23D 37/06; B23D 37/08; B23D 37/12; B23D 37/22; B23D 41/06; B23D 43/02; B23D 2043/025
See application file for complete search history.

(56) References Cited

U.S. PATENT DOCUMENTS

| | | | | |
|---|---|---|---|---|
| 1,529,267 A | * | 3/1925 | Myers ................. | B23F 1/04 125/11.15 |
| 2,629,294 A | * | 2/1953 | Kopec ................. | B23D 43/02 407/14 |

(Continued)

OTHER PUBLICATIONS

EPO Search Report dated Feb. 4, 2019 for Patent Application No. 18190000.2.

*Primary Examiner* — Alan Snyder
*Assistant Examiner* — Yasir A Diab
(74) *Attorney, Agent, or Firm* — O'Shea Getz P.C.

(57) ABSTRACT

Aspects of the disclosure are directed to a first chip ring that includes a first through slot, a second chip ring that includes a second through slot, and a component disposed between the first chip ring and the second chip ring that includes a component through slot, where the first, second and component through slots are coaxial along a slot axis this is oriented at a non-zero valued angle relative to a planar surface of the component facing at least one of the first and second chip rings.

20 Claims, 8 Drawing Sheets

(51) Int. Cl.
    *F04D 29/32* (2006.01)
    *F01D 15/12* (2006.01)
    *B23D 37/22* (2006.01)

(56) References Cited

U.S. PATENT DOCUMENTS

| | | | | |
|---|---|---|---|---|
| 2,972,274 | A * | 2/1961 | La Bombard | F16B 19/05 407/16 |
| 3,000,086 | A * | 9/1961 | Davis | F16B 5/06 24/453 |
| 3,022,710 | A * | 2/1962 | Kopec | B26F 1/086 407/11 |
| 4,266,894 | A * | 5/1981 | Zuzanov | B23D 37/10 407/13 |
| 5,489,169 | A * | 2/1996 | Scott | B23D 37/10 409/244 |
| 6,333,069 | B1 * | 12/2001 | Beeck | F01D 5/186 427/140 |
| 6,573,474 | B1 * | 6/2003 | Loringer | F01D 5/284 219/121.71 |
| 8,973,264 | B2 | 3/2015 | Barnat et al. | |
| 2003/0086765 | A1 | 5/2003 | Nolan et al. | |
| 2005/0173388 | A1 * | 8/2005 | Lavers | B23H 9/10 219/121.71 |
| 2009/0214351 | A1 * | 8/2009 | Guo | B23C 3/34 416/219 R |
| 2013/0020293 | A1 * | 1/2013 | Elfizy | B23K 26/388 219/121.71 |
| 2013/0269354 | A1 * | 10/2013 | Starkweather | F23R 3/06 60/754 |
| 2015/0375312 | A1 | 12/2015 | Mandrile et al. | |

\* cited by examiner

ENTRANCE AND EXIT CHIP RINGS FOR BALANCING BROACH FORCES

BACKGROUND

Gas turbine engines, such as those which power aircraft and industrial equipment, employ a compressor to compress air that is drawn into the engine and a turbine to capture energy associated with the combustion of a fuel-air mixture. The compressor and the turbine include disks. The disks include slots that seat blades. A slot in a disk holds a blade in place and resists centrifugal forces that would otherwise cause the blade to become detached from the disk.

Referring to FIG. 2A, a system 200 for forming a slot 206 in a disk 212 is shown. In particular, a broach tool 218 is used to machine the slot 206 in the disk 212. The broach tool 218 is initially applied to the disk 212 at an entrance/surface 212a of the disk 212. Continued application of the broach tool 218 (e.g., teeth 218a of the broach tool 218) to the disk 212 causes material of the disk 212 to be removed; this removal of material forms the slot 206 in the disk 212.

Referring to FIG. 2B, the slot 206 is shown in greater detail. As shown, the slot 206 frequently is of a "fir-tree" profile in terms of a shape/pattern of, e.g., walls 212b and 212c of the disk 212 that remain following the removal of the material as described above. More generally, the shape of the slot 206 may match a shape of a root of a blade.

Referring to FIGS. 2A-2C, often the slot 206 is not parallel to a normal 'N' of the disk 212 at, e.g., the surface 212a. Instead, an axis 'A' of the slot 206 is oriented at an angle 'θ' (referred to herein as a slash angle) with respect to the normal 'N'. The value of the slash angle is usually between three and fifteen degrees.

Due to the slash angle, the broach teeth 218a are not subjected to equal forces/loads on either side of the broach tool 218, which is to say that the broach teeth 218a experience asymmetrical forces/loads. Due to finite stiffness of the broach teeth 218a, the teeth 218a deflect in the presence of force/load. The deflection potentially causes dimensional errors or quality problems in the slot 206. Such dimensional errors/quality problems may be manifested as waviness in the slot 206/walls 212b-212c. Still further, the deflection may result in a deviation in terms of material removal relative to a specification of the slot 206/walls 212b-212c.

An expendable chip ring 230 is often used in conjunction with an exit 212d of the disk 212 (where the term/label 'exit' is referenced relative to the completion of the broaching process with respect to the disk 212). The chip ring 230 is used so that any burr that is produced is left on the chip ring 230 rather than on the disk 212. The chip ring 230 helps to maintain a temperature profile at the exit 212d of the disk 212 within specified limits, ensuring that any burr that is formed is present on the chip ring 230 (and not on the disk 212). The chip ring 230 provides thermal mass ahead/in advance of the broach tool 218 so that chips shear with an adequately high shear angle (e.g., with a shear angle greater than a threshold); this ensures that degradation to the disk 212 due to cessation of chip formation when the broach tool 218 exits the disk 212 and enters the chip ring 230 is small (e.g., less than a threshold). Frequently, the chip ring 230 is held tightly against the exit side of the disk 212 between the disk and a backing fixture during the formation of the slot 206 to limit/reduce/minimize the extent that the disk 212 deflects. A chip ring (e.g., chip ring 230) may also be referred to as a thermal ring or force ring herein.

Three material properties impact the errors/quality problems described above: (1) material elasticity, (2) hardness, and (3) machinability. Material elasticity relates to the disk 212/chip ring 230 stiffness, and is a representation of a degree to which the disk 212/chip ring 230 deflect in the presence of a force resulting from the application of the broach tool 218. Hardness relates to the machining forces that would be exhibited when the broach tool 218 is penetrating the material of the disk 212/chip ring 230. Machinability relates to the level of wear sustained by the broach tool 218 for a given tool traversal length. An improved approach for forming a slot that takes into account the foregoing, including the aforementioned material properties, is needed.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system comprising: a first chip ring that includes a first through slot, a second chip ring that includes a second through slot, and a component disposed between the first chip ring and the second chip ring that includes a component through slot, where the first, second and component through slots are coaxial along a slot axis this is oriented at a non-zero valued angle relative to a planar surface of the component facing at least one of the first and second chip rings. In some embodiments, the first chip ring is made of iron. In some embodiments, the second chip ring is made of iron. In some embodiments, the component is made of at least one of titanium or nickel. In some embodiments, the first chip ring includes a first angular step in a first exterior surface of the first chip ring, the first exterior surface opposed to the component. In some embodiments, the second chip ring includes a second angular step in a second exterior surface of the second chip ring, the second exterior surface opposed to the component. In some embodiments, a planar surface of the first angular step is substantially perpendicular to the slot axis. In some embodiments, sidewalls of the first, second and component through slots comprise a fir-tree or dovetail profile. In some embodiments, the slot axis is oriented at an angle relative to a normal of the planar surface of the component. In some embodiments, the angle relative to the normal is between three and fifteen degrees. In some embodiments, the system further comprises a broach tool that is applied to the first chip ring, the second chip ring, and the component to form the first, second and component through slot. In some embodiments, the broach tool includes a first plurality of teeth on a first side of the broach tool and a second plurality of teeth on a second side of the broach tool. In some embodiments, the component is one of a disk or a gear.

Aspects of the disclosure are directed to a method comprising: coupling a first chip ring to a component with intimate contact between the first chip ring and the component, applying a tooth of a broach tool to the first chip ring to form a first through slot, and applying the tooth of the broach tool to the component subsequent to applying the tooth of the broach tool to the first chip ring to form a component though slot in the component, where the first and component through slots are coaxial along a slot axis that is normal to a planar surface of the component facing the first chip ring. In some embodiments, the first chip ring is coupled to the component using at least one of a fastener, a clamp, or an adhesive. In some embodiments, the method further comprises forming a first angular step in the first chip ring as a slanted 'V'-shape in an exterior surface of the first chip ring, the exterior surface opposed to the component. In some embodiments, a planar surface of the first angular step is substantially perpendicular to the slot axis. In some embodiments, the method further comprises applying the tooth of the broach tool to a second chip ring to form a second through slot subsequent to applying the tooth of the broach tool to the component, where the second through slot is coaxial with the first and component through slots, and where the component is disposed between the first chip ring and the second chip ring.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
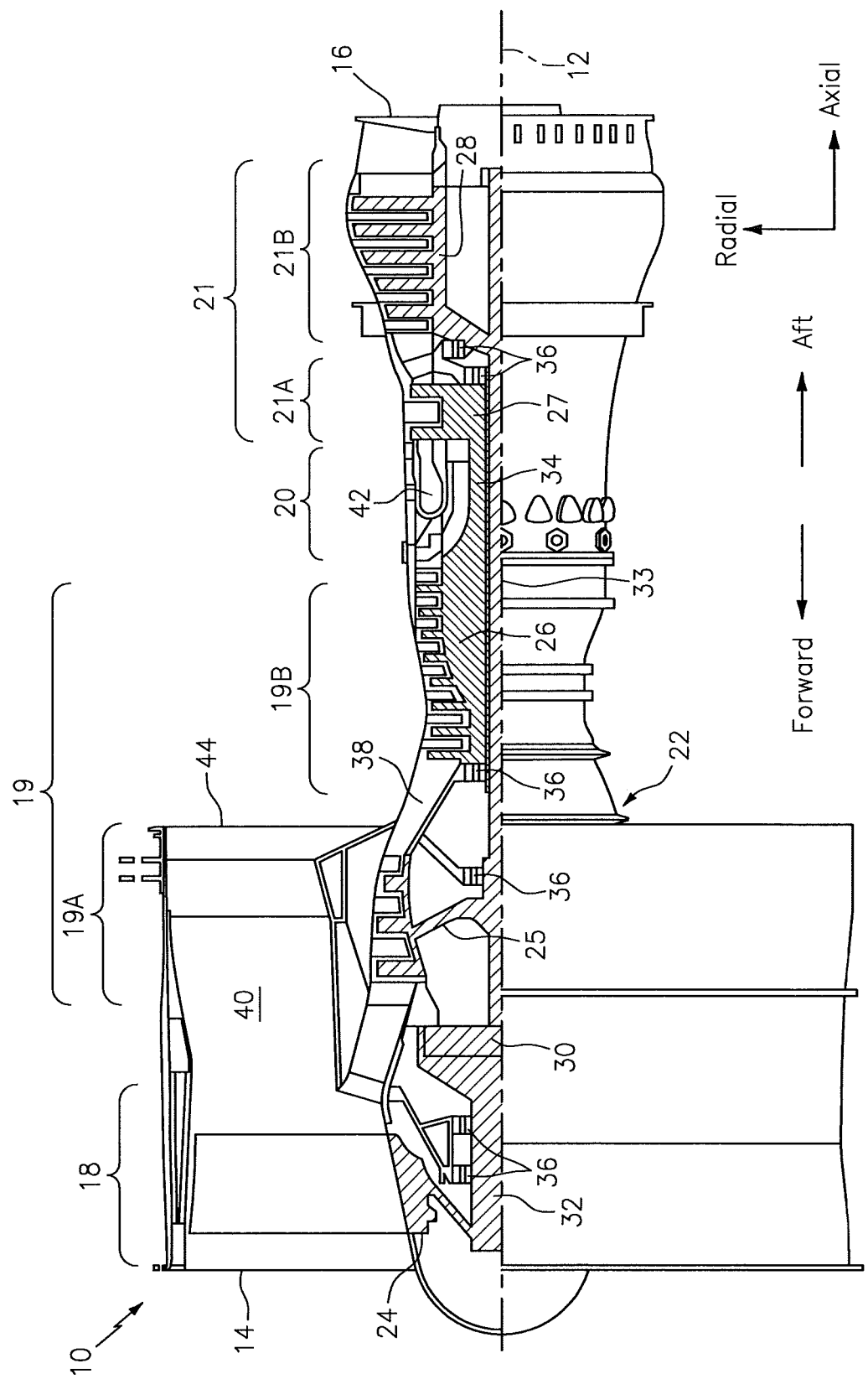
FIG. 1 is a side cutaway illustration of a geared turbine engine.
Figure 2A:
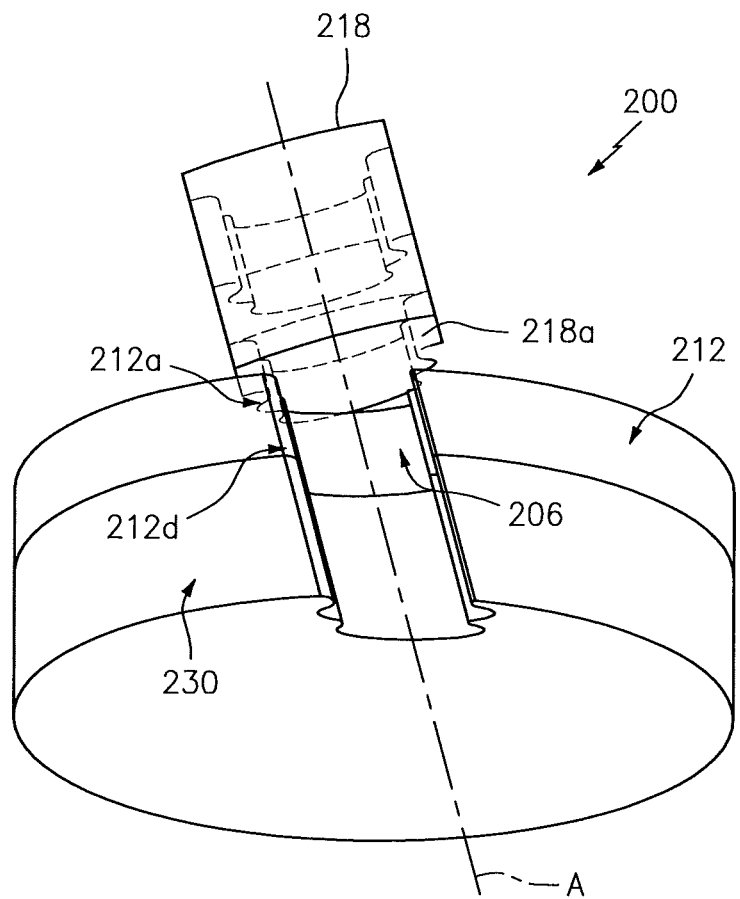
FIG. 2A illustrates a system for machining a slot in a disk in accordance with the prior art.
Figure 2B:
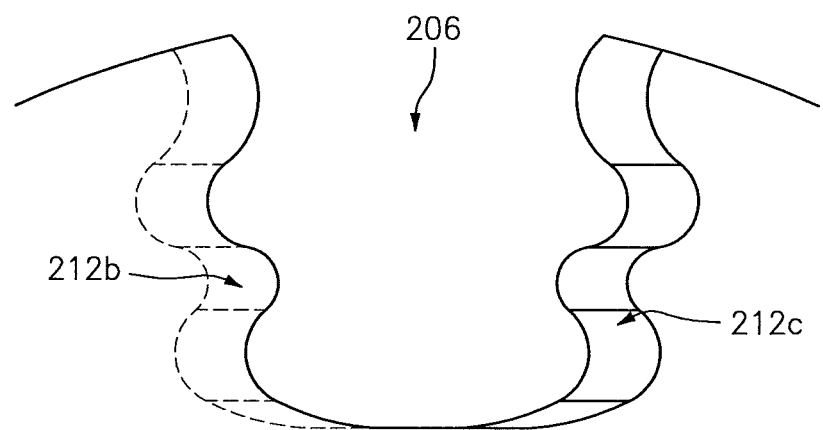
FIG. 2B illustrates a slot in a disk in accordance with the prior art.
Figure 2C:
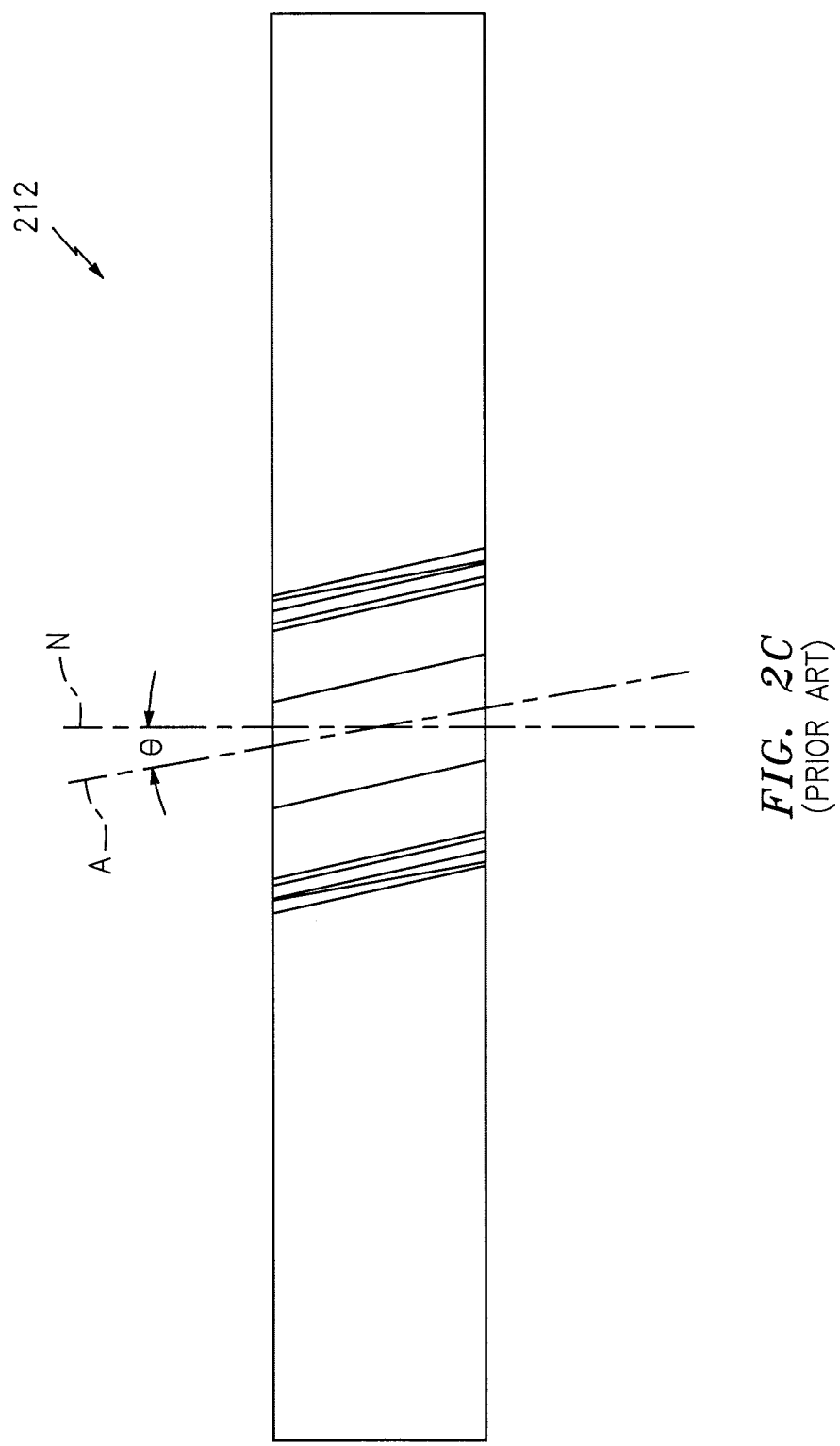
FIG. 2C illustrates a slash angle in accordance with the prior art.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3A:
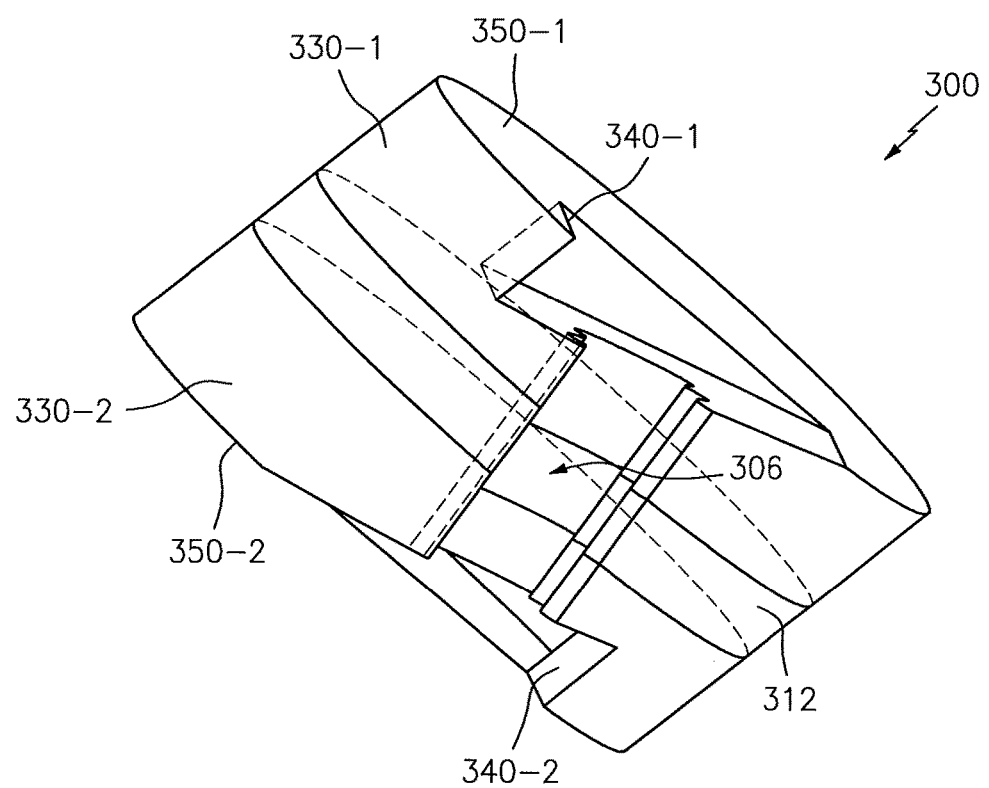
FIGS. 3A-3B illustrate a system for machining a slot in a disk in accordance with aspects of this disclosure.
Figure 3B:
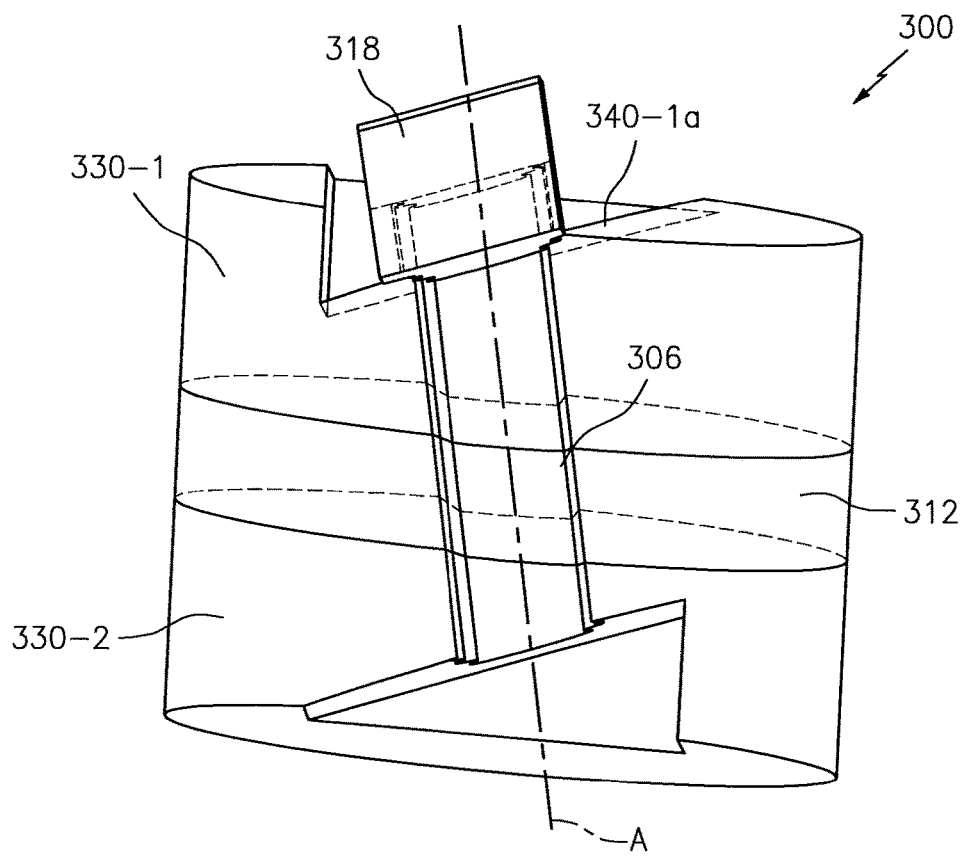

Referring to FIGS. 3A-3B, a system 300 for machining a slot 306 in a disk 312 is shown. The system 300 may include two chip rings, such as for example a first chip ring 330-1 and a second chip ring 330-2. The disk 312 may be disposed between the first chip ring 330-1 and the second chip ring 330-2. In terms of the formation (e.g., machining) of the slot 306, the first chip ring 330-1 may serve as an entrance with respect to a broach tool 318 and the second chip ring 330-2 may serve as an exit with respect to the broach tool 318.

The use of two chip rings 330-1 and 330-2 may help to ensure that the entirety of the disk 312 experiences a substantially constant thermal wave/temperature profile during machining and cutting chip formation in the slot 306, thereby enhancing the quality of the slot 306. Such a thermal wave may be generated based on the cutting action of/contact between the broach tool 318 relative to the material(s) of the chip rings 330-1 and 330-2 and the disk 312.

The broach tool 318 may be made of one or more materials. For example, the broach tool 318 may include steel.

The first chip ring 330-1 may include a first angular step 340-1 in a surface 350-1 of the first chip ring 330-1 on the broach tool 318 entrance side of the disk 312 not in contact with the disk surface (where the exterior surface 350-1 is opposed to the disk 312) that is perpendicular to the disk 312 slot centerline and a second surface in contact with the disk 312 entrance side surface that is fully in contact with the disk 312 surface/face with no angular step. Similarly, the second chip ring 330-2 may include a second angular step 340-2 in an exterior surface 350-2 of the second chip ring 330-1 (where the exterior surface 350-2 is opposed to the disk 312). The steps 340-1 and 340-2 are referred to as 'angular' due to the fact that they might not be formed completely parallel and perpendicular to, e.g., their respective surfaces 350-1 and 350-2. Instead, at least a part of the steps 340-1 and 340-2 may be related to the slash angle as described below. The first chip ring 330-1 need not have a step if the chip ring 330-1 thickness provides time for the broach tool forces to equalize prior to the broach tool starting to cut (e.g., "machine") the material of the disk. This thickness can be optimally designed using the material characteristics of both the broach cutting tool and the chip ring 330-1, but can be effective if the first chip ring thickness equals, e.g., approximately one-half the thickness of the part to be machined. In addition, the second chip ring 330-2 may be at the broaching tool exit side of the part sandwiched between the part and a broach backing fixture (not shown) and may not require an angular step.

The first angular step 340-1 and the second angular step 340-2 may be of a substantially similar shape/profile as shown. The angular steps 340-1 and 340-2 may be substantially 'V'-shaped. The 'V'-shape may be skewed/slanted as shown in FIG. 3A. Other shapes of the angular steps 340-1 and 340-2 may be used. The dimensions of the angular steps 340-1 and 340-2 may be selected to accommodate seating the broach tool 318.

In some embodiments, the first angular step 340-1 and the second angular step 340-2 may be machined into the first chip ring 330-1 and the second chip ring 330-2, respectively. The angular steps 340-1 and 340-2 may be machined to a nominal accuracy/dimension. A planar surface 340-1a of the first angular step 340-1 may be substantially perpendicular to the axis 'A' of the slot 306 (wherein the axis 'A', in turn, may be related to the slash angle as described above).

Figure 3C:
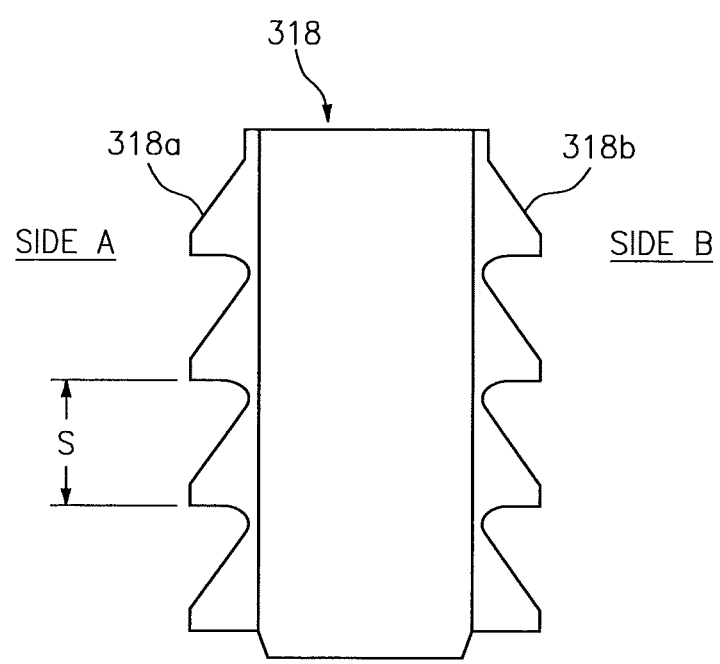
FIG. 3C illustrates a profile of a broach tool in accordance with aspects of this disclosure.

Referring to FIGS. 3A-3C, once a number of teeth (e.g., teeth 318a and 318b) of the broach tool 318 are engaged with the (material of the) first chip ring 330-1, the angular steps 340-1 and 340-2 (e.g., the planar surface 340-1a) may substantially prevent individual teeth of the broach tool 318 from deflecting. The use of the first angular step 340-1 and the second angular step 340-2 may ensure that the broach tool 318 enters and exits the disk 312 in a symmetrical manner. The broach tool 318, as a whole, may self-adjust to any oblique/skewed forces that may be generated.

Chip rings 330-1 and 330-2 may be used once per part in the same set-up until all of the slots have been machined into the disk 312, and then one or more of the chip rings 330-1 and 330-2 may be discarded. The cost offset by the slot quality, especially at the slot edges, and the reduction in variation of the slot edge may provide for an overall lower cost machining or surface treatment of these edges. Materials that may be used as part of the chip rings 330-1 and 330-2 include cast iron and steel; these materials may provide thermal and mechanical energy transfer characteristics to facilitate the formation of the slot 306 as described herein. The use of iron may also represent a material that does not impose significant wear to the (teeth 318a and 318b of the) broach tool 318, which is to say that the material of the chip rings 330-1 and 330-2 may be readily machined. The use of such materials may help to reduce/minimize wear on the broach tool 318 (e.g., the teeth 318a and 318b).

The benefits can be optimized if the chip rings 330-1 and 330-2 and the disk 312 may be substantially matched to one another in terms of one or more properties, such as for example elasticity and hardness. Substantially similar elasticity between the chip rings 330-1 and 330-2 and the disk 312 may allow for burr formation and collection by the chip rings 330-1 and 330-2. Substantially similar hardness between the chip rings 330-1 and 330-2 and the disk 312 may ensure that cutting forces incurred when the broach tool 318 passes over the chip rings 330-1 and 330-2 at the interfaces between the chip rings 330-1 and 330-2 and the disk 312 are substantially the same.

As described herein, the use of the chip rings 330-1 and 330-2, in conjunction with their respective angular steps 340-1 and 340-2 and/or based on an associated chip ring dimension (e.g., thickness), may help to ensure that substantially symmetrical loads/forces are experienced on either side (e.g., side A and side B in FIG. 3C) of the broach tool 318 by the teeth 318a and 318b. This may help to ensure that the slot 306 formed in the disk 312 conforms to a specification and enhances the quality of the slot 306 in terms of the same. The wear experienced by the broach tool 318 (e.g., the teeth 318a and 318b) may be substantially the same, allowing for more economical (e.g., symmetrical) regrinding and reuse of the broach tool 318.

Conventionally, the teeth of the broach tool were placed in close proximity to one another. This was due at least in part to the asymmetry experienced in terms of loads/forces described above and the need to maintain a specified number of teeth of the broach tool in engagement with the disk (or chip ring) at any given point in time. Due to a realization of symmetrical loads/forces from adding the entrance chip ring as described above, the inter-tooth spacing 'S' (see FIG. 3C) between adjacent teeth on a given side of the broach tool may be increased. Increasing the spacing 'S' may provide for enhanced lubrication, as lubricant that may be supplied to the teeth may be less prone to becoming trapped/stuck between the teeth as the spacing 'S' is increased. In other words, the flow of lubricant may be enhanced as the spacing 'S' increases. In some embodiments, a reservoir for the lubricant may be provided. The reservoir may store the lubricant and may be at least partially located in a chip ring.

Figure 4:
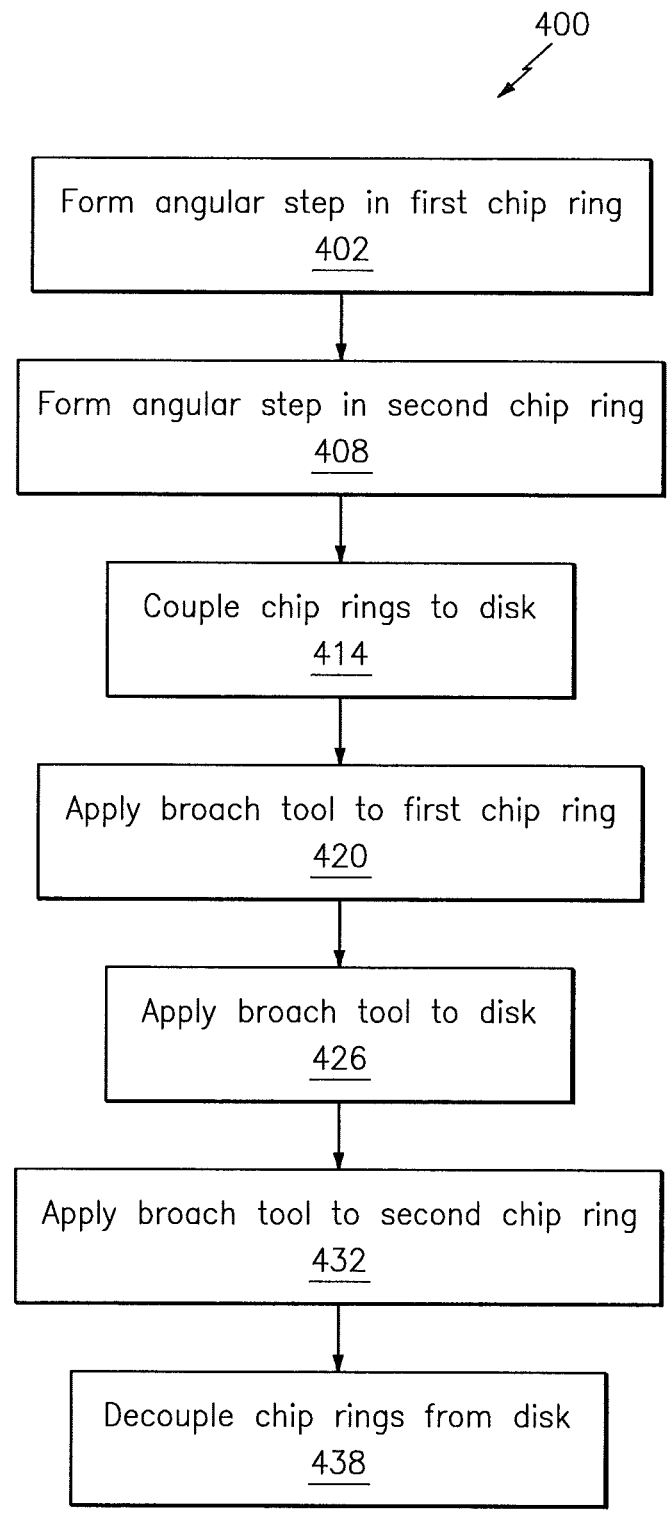
FIG. 4 illustrates a flow chart of a method for forming a slot in a disk in accordance with aspects of this disclosure.

Referring now to FIG. 4, a flow chart of a method 400 is shown. The method may be used to form a slot in a disk. The method is described below in conjunction with the system 300 for illustrative convenience. The method may be adapted to accommodate other systems/components/devices.

In block 402, the first angular step 340-1 may be formed in the first chip ring 330-1. The operations of block 402 may occur using one or more machining operations.

In block 408, the second angular step 340-2 may be formed in the second chip ring 330-2. The operations of block 408 may occur using one or more machining operations.

In block 414, the first chip ring 330-1 and the second chip ring 330-2 may be coupled to the disk 312 (see, e.g., FIG. 3A where the chip rings 330-1 and 330-2 and the disk 312 are shown in mated assembly). That is, the chip rings sandwich the disk. One or more attachments mechanisms (e.g., a fastener, a clamp, adhesive, fixturing, etc.) may be used as part of block 414.

In block 420, (a tooth of) the broach tool 318 may (initially) be applied to the first chip ring 330-1.

In block 426, progressive application of the broach tool 318 as part of block 420 may result in the (tooth of the) broach tool 318 being applied to the disk 312 to provide for the formation (e.g., machining) of the slot 306 in the disk 312

In block 432, the (tooth of the) broach tool 318 may be applied to the second chip ring 330-2.

In block 438, the chip rings 330-1 and 330-2 may be decoupled from the disk 312. The decoupling in block 438 may be performed following the completion of the slot/hole broaching procedure.

As part of one or more of the blocks 420-432, lubricant/coolant may be supplied/circulated in order to cool the broach tool 318 (e.g., the teeth 318*a* and 318*b*) and/or the disk 312.

The method 400 is illustrative. The blocks shown may execute in an order or sequence that is different from what is shown in FIG. 4. One or more of the blocks (or one or more portions thereof) may be optional. Additionally blocks not shown may be included.

Exemplary embodiments of this disclosure have been described in terms of a formation of a slot in a disk of an engine. Aspects of the disclosure may be applied to other components/devices, such as for example other components/devices of an engine. For example, aspects of the disclosure may be used to form teeth in one or more gears. More generally, aspects of the disclosure may be applied to a broaching procedure/methodology in a multitude of different application environments/contexts. Features that may be shaped (e.g., broached) in accordance with this disclosure include holes/slots, spline or gear teeth, key ways, keyhole slots, etc.

While some of the examples described herein incorporate the use of a broach tool, aspects of the disclosure may be applied in connection with other types of tools. For example, aspects of the disclosure may be applied in connection with a milling machine (see, e.g., U.S. Pat. No. 8,973,264 for examples of a milling machine—the contents of the U.S. Pat. No. 8,973,264 patent are incorporated herein by reference). A milling machine may be used to form a slot in accordance with aspects of this disclosure.

Aspects of the disclosure may be used to obtain a high quality fir-tree profile in terms of, e.g., a dimensional and surface quality/integrity standpoint. Aspects of the disclosure may keep broaching forces balanced to obtain a higher broaching tool-life than is present conventionally. Aspects of the disclosure may include/present a thermal mass during a broaching procedure so that edges of the fir-tree suffer less (e.g., minimal) impairment.

Aspects of the disclosure are directed to: a first chip ring that is solid, a second chip ring that is solid, and a component disposed between the first chip ring and the second chip ring. A machining procedure may be used to produce a slot or hole by broaching through the first chip ring, then the component, then the second chip ring. An axis of a cutting tool in a direction of a cutting motion may be oriented at an angle that is not perpendicular to the first component surface encountered by the cutting tool such that the cutting tool is simultaneously engaged in the first chip ring and the component when the cutting tool is in the act of cutting or machining as the cutting tool moves across the interface between the first chip ring and the component. Cutting forces may be shared (e.g., distributed). Thermal energy between the component and the first chip ring may be controlled/regulated. Subsequently, the procedure/technique may provide for continued cutting through the component and may leave the component sharing the same forces and thermal energy across an interface between the component and the second chip ring, leaving a rough or finished slot or hole in the first chip ring, the component and the second chip ring sharing a common/coaxial axis.

Aspects of the disclosure are directed to the use/provisioning of a disposable or perishable chip ring to build cutting forces and a thermal profile between a cutter (e.g., a broach tool) and the chip ring prior to transferring these forces and thermal profile to a component (e.g., a disk). Thus, the cutting forces and thermal profile may be stable for a full dimension (e.g., length) of the component. Any defects in terms of, e.g., unstable forces or a thermal profile may be moved/allocated to one or both of the entrance chip ring (e.g., chip ring 330-1) and exit chip ring (e.g., chip ring 330-2) which may be subsequently discarded, thereby discarding/eliminating any potential defects in the component that might otherwise be caused by the unstable forces and thermal profile. Intimate contact between the component and the chip ring may assist in maintaining stable forces and thermal profile(s).

While some of the examples described herein pertain to the use of chip rings, aspects of the disclosure are directed to a use of stock material at an entrance and/or exit side of a component. In some embodiments, machining may be performed without chip rings and surfaces of the component on the entrance and exit sides may be machined to remove any potential defects in these locations. The use of chip rings may enable a reduction in terms of cost or manufacturing time, and may reduce (e.g., prevent) degrading a slot that is formed/included through the component.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system comprising:
   a first chip ring that includes a first through slot;
   a second chip ring that includes a second through slot;
   a component disposed between the first chip ring and the second chip ring, and that includes a component through slot, where the first, second and component through slots are coaxial along a slot axis this is oriented at a non-zero valued angle relative to a planar surface of the component facing at least one of the first and second chip rings,
   wherein the first chip ring includes a first angular step in a first exterior surface of the first chip ring, the first exterior surface opposed to the component.

2. The system of claim 1, wherein the first chip ring is made of iron.

3. The system of claim 2, wherein the second chip ring is made of iron.

4. The system of claim 2, wherein the component is made of at least one of titanium or nickel.

5. The system of claim 1, wherein the second chip ring includes a second angular step in a second exterior surface of the second chip ring, the second exterior surface opposed to the component.

6. The system of claim 1, wherein a planar surface of the first angular step is substantially perpendicular to the slot or hole axis.

7. The system of claim 1, where sidewalls of the first, second and component through slots comprise one of a fir-tree and a dovetail profile.

8. The system of claim 1, wherein the slot axis is oriented at an angle relative to a normal of the planar surface of the component.

9. The system of claim 8, wherein the angle relative to the normal is between three and fifteen degrees.

10. The system of claim 7, further comprising:
a broach tool that is applied to the first chip ring, the second chip ring, and the component to form the first, second and component through slot.

11. The system of claim 10, wherein the broach tool includes a first plurality of teeth on a first side of the broach tool and a second plurality of teeth on a second side of the broach tool.

12. The system of claim 1, wherein the component is one of a disk or a gear.

13. A method comprising:
coupling a first chip ring to a component with intimate contact between the first chip ring and the component;
applying a tooth of a broach tool to the first chip ring to form a first through slot;
applying the tooth of the broach tool to the component subsequent to applying the tooth of the broach tool to the first chip ring to form a component though slot in the component, where the first and component through slots are coaxial along a slot axis this is normal to a planar surface of the component facing the first chip ring; and
forming a first angular step in the first chip ring as a slanted 'V'-shape in an exterior surface of the first chip ring, the exterior surface opposed to the component.

14. The method of claim 13, wherein the first chip ring is coupled to the component using at least one of a fastener, a clamp, and an adhesive.

15. The method of claim 13, wherein a planar surface of the first angular step is substantially perpendicular to the slot axis.

16. The method of claim 13, further comprising:
applying the tooth of the broach tool to a second chip ring to form a second through slot subsequent to applying the tooth of the broach tool to the component, where the second through slot is coaxial with the first and component through slots, and where the component is disposed between the first chip ring and the second chip ring.

17. A system comprising:
a first chip ring that includes a first through slot;
a second chip ring that includes a second through slot;
a component disposed between the first chip ring and the second chip ring, and that includes a component through slot, where the first, second and component through slots are coaxial along a slot axis this is oriented at a non-zero valued angle relative to a planar surface of the component facing at least one of the first and second chip rings,
wherein the first chip ring is made of iron.

18. The system of claim 17, wherein the first chip ring includes a first angular step in a first exterior surface of the first chip ring, the first exterior surface opposed to the component.

19. The system of claim 18, wherein the second chip ring includes a second angular step in a second exterior surface of the second chip ring, the second exterior surface opposed to the component.

20. The system of claim 17, where sidewalls of the first, second and component through slots comprise one of a fir-tree and a dovetail profile.

* * * * *